Figure 1:
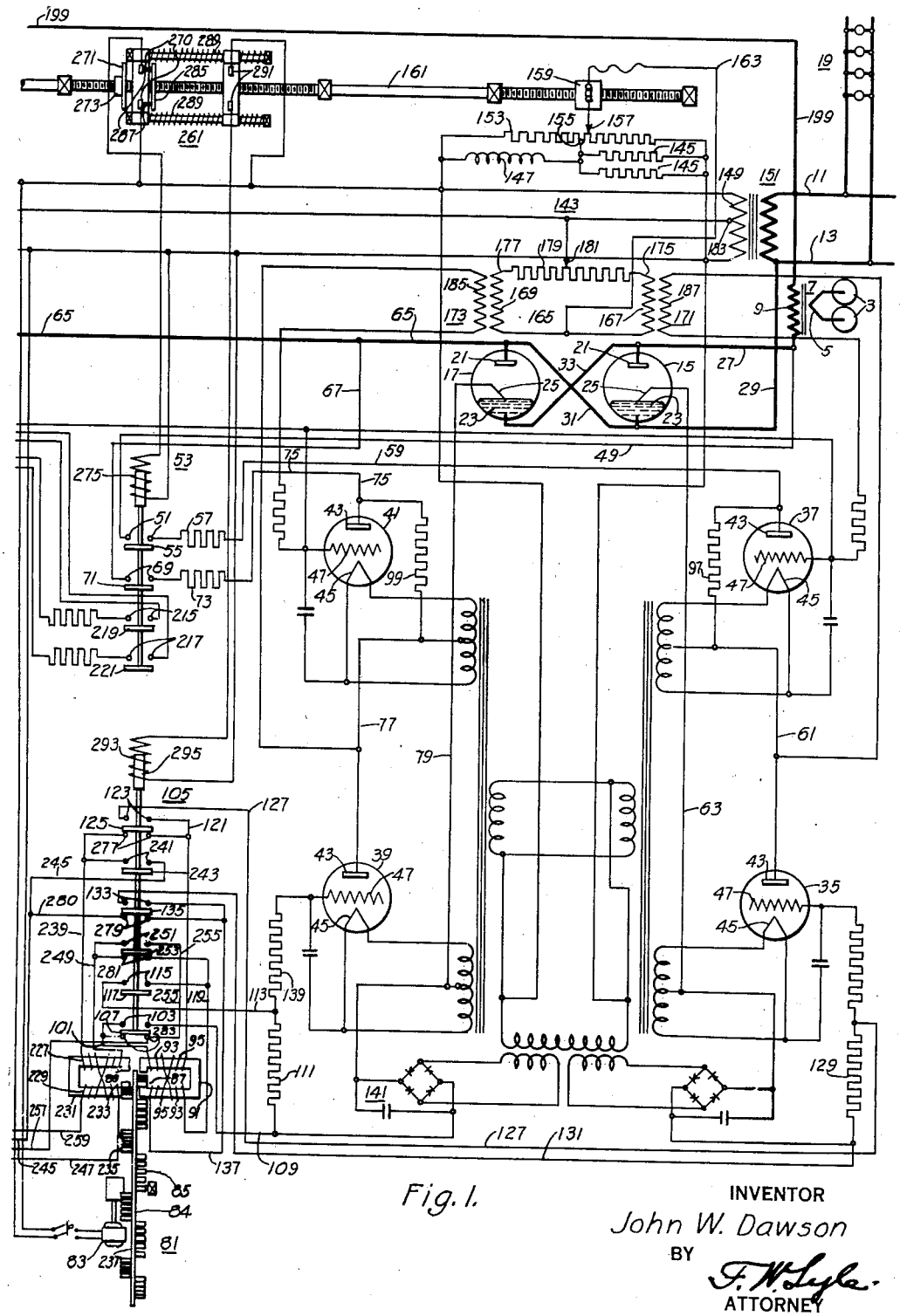

June 13, 1939.　　　　J. W. DAWSON　　　　2,162,530
WELDING APPARATUS
Filed Nov. 6, 1937　　　　2 Sheets-Sheet 2

WITNESSES:
INVENTOR
John W. Dawson
BY
ATTORNEY

Patented June 13, 1939

2,162,530

UNITED STATES PATENT OFFICE 2,162,530

WELDING APPARATUS

John W. Dawson, Turtle Creek, Pa., assignor to Westinghouse Electric & Manufacturing Company, East Pittsburgh, Pa., a corporation of Pennsylvania Application November 6, 1937, Serial No. 173,183

18 Claims. (Cl. 171—97)

My invention relates to power supply apparatus and has particular relation to apparatus in which large pulses of energy are supplied to a load intermittently as, for example, in resistance welding.

Where large pulses of energy are intermittently drawn from a commercial power line, as is the case in resistance, spot and seam welding, large fluctuations take place in the potential impressed on other loads connected to the line. These fluctuations are, of course, in general, undesirable, but they are particularly obnoxious when among the additional loads supplied by the line there are lighting circuits. In such a case, the lamps in the lighting circuits flicker while the intermittent load is being supplied and their intensity also varies when the delivery of energy to the intermittent load is being initiated or discontinued. If the lighting circuits happen to be used in a locality near a plant where there is considerable welding, the variation of the illumination intensity of the lamps when the numerous welding processes are being initiated and discontinued, and the flicker during the operation of the welders produces a highly unsatisfactory condition.

It is, accordingly, an object of my invention to provide a system for supplying intermittent pulses of energy of substantial magnitude from a power line to a load which shall operate in such manner that no large fluctuations shall exist in the potential impressed on the other loads supplied from the line while the intermittent load is being supplied.

Another object of my invention is to provide a system for supplying a load with pulses of energy of considerable magnitude intermittently from a power line which shall operate in such manner that there shall be no large fluctuations in the potential impressed on other loads supplied from the line when the supply to the intermittent load is being initiated or discontinued.

A more specific object of my invention is to provide a resistance spot and seam welding system that shall not produce large fluctuations in the potentials impressed on the other loads that happen to be supplied from the same line as the welding load.

Another specific object of my invention is to provide a resistance, spot and seam welding system that shall not produce flicker in a lighting system supplied from the same line as the welding load.

Still another object of my invention is to provide a resistance, spot and seam welding system that shall not produce variations in the luminous output of lighting systems supplied from the same line as the welding load during the initiation or the discontinuance of power supply to the welding load.

More concisely stated, it is an object of my invention to provide translating apparatus for supplying a load requiring intermittent pulses of energy of considerable magnitude that shall in operation draw power from the supply source uniformly.

According to my invention, I provide an additional load, which may be designated herein as a dummy load, and which has substantially the same properties as the main load. The dummy load is provided with a control system similar to that of the main load and operating in synchronism therewith. The dummy control system provides for the supply of power to the dummy load during the intervals between the supply of pulses to the main load. The power supplied to the dummy load is thus also pulsating and the latter pulsations are adjusted to the same magnitude as those supplied to the main load, so that the power drawn from the source during operation of the main load is uniform.

During the intervals when the supply of power to the main load is being initiated or discontinued, the main load is entirely disconnected from the source and the dummy load alone is supplied continuously. The supply of power to the dummy load during the initiation of power supply to the main load is gradually increased from zero to the desired value. When the supply of power to the main load is being discontinued, the dummy load is again supplied with power continuously and the supply is gradually decreased from the main load value to zero. Thus, abrupt variations in the power drawn from the supply line are entirely suppressed and the fluctuations produced by such variations in the potential supplied to whatever other loads happen to be connected to the line are avoided.

As has been explained, my invention is primarily adapted to be used in resistance, spot and seam welding apparatus. Accordingly, while the principles of my invention are applicable to current and power ranges of all magnitudes, they have particular application to systems in which the current drawn from a line has the magnitude of resistance welding current; that is, is of the order of from 10 to several thousand amperes.

Figure 2:
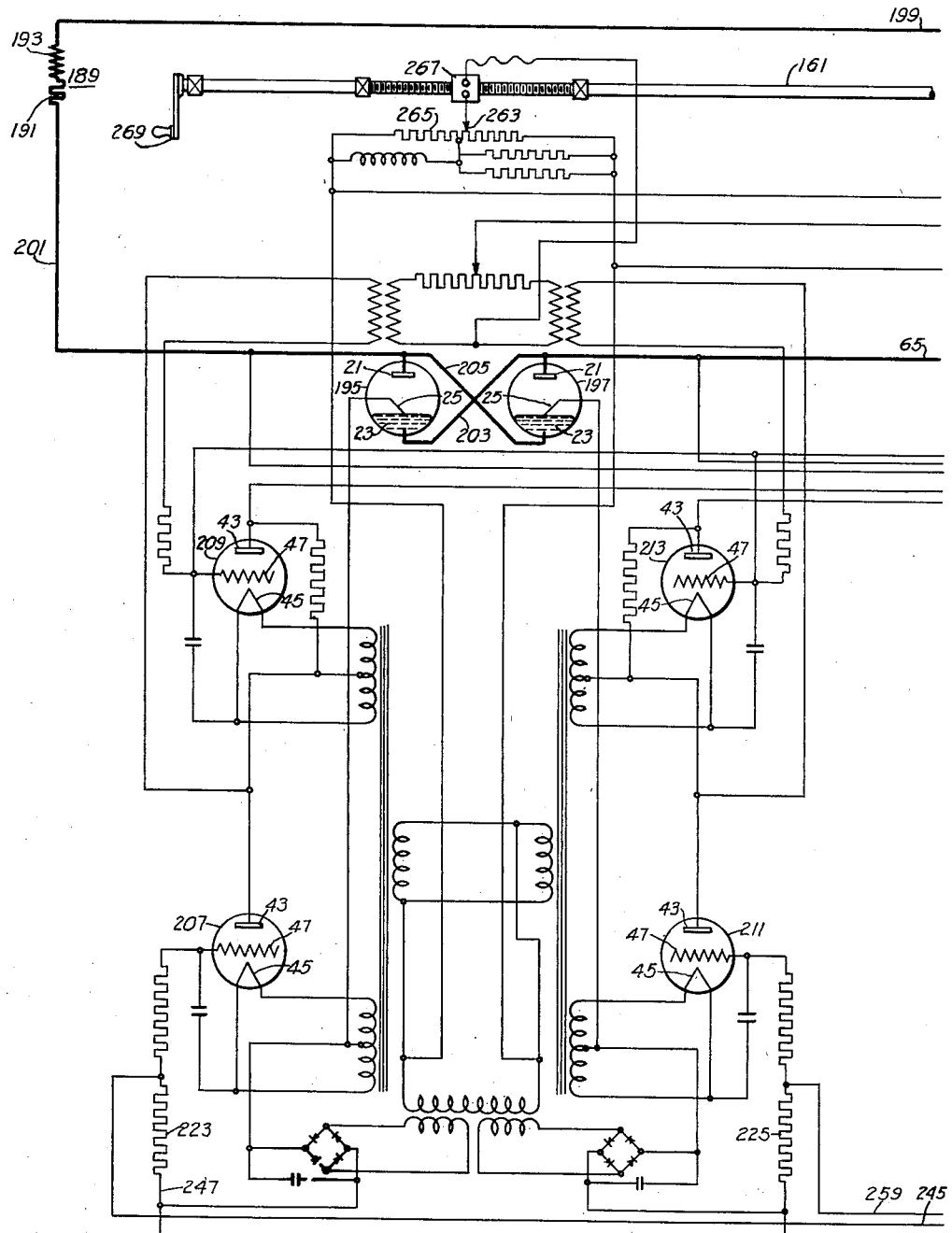

The novel features that I consider characteristic of my invention are set forth with particularity in the appended claims. The invention itself, however, both as to its organization and its method of operation, together with additional objects and advantages thereof, will best be understood from the following description of a specific embodiment when read in connection with the accompanying drawings, in which:

Figures 1 and 2 constitute together a diagrammatic view showing a circuit constructed in accordance with my invention.

The apparatus shown in the drawings comprises a pair of welding terminals 3 connected to the secondary 5 of a suitable step-down welding transformer 7. It is to be noted, of course, that the transformer 7 is used to increase the current to the desired welding value and where the current desired is relatively moderate, it may be possible to dispense with it entirely.

The primary 9 of the transformer 7 is coupled to the bus conductors 11 and 13 of a power supply line through a pair of discharge paths 15 and 17 connected in anti-parallel. The power line may be of the ordinary commercial 60 cycle type and may supply in addition to the transformer 7 a number of other loads including one or more lighting circuits 19.

The discharge paths 15 and 17 are specifically shown as of the mercury-pool immersed ignition-electrode type. They may, however, be of any general type, such as hot cathode grid controlled gaseous discharge devices, mercury pool grid controlled or collar controlled discharge devices or even hot cathode high vacuum discharge devices. The anti-parallel discharge paths 15 and 17 are moreover illustrated as discrete units. They may be combined into a single unit consisting of a pair of mercury pools alternating in operation as cathodes and anodes and provided with the usual cooperative control or ignition electrodes.

Each of the discharge paths 15 and 17 has an anode 21, a mercury pool cathode 23 and an ignition electrode 25 composed of a high resistant material such as boron, boron carbide, silicon, or silicon carbide which dips into the mercury.

The circuit for current flow of one polarity through the primary 9 of the welding transformer 7 extends from the upper line wire 11 of the supply through the primary, a conductor 27, the anode 21 and the cathode 23 of the right-hand discharge path 15, a conductor 29 to the lower bus 13. Current of the opposite polarity flows through the primary 9 in a circuit extending from the lower line wire 13 through the conductor 29, a conductor 31, the anode and the cathode of the left-hand discharge path 17, a conductor 33, the conductor 27, the primary to the upper line wire 11.

To initiate a discharge in the discharge paths 15 or 17 a pulse of current is transmitted through the ignition electrodes 25 and the associated mercury pools 23. By reason of the connection to the line wires 11 and 13 the potential of the anode 21 relative to the cathode 23 of each of the discharge paths 15 and 17 is positive and negative during alternate half cycles of the source and the corresponding potential of the other path is at the same time respectively negative and positive. An initiating pulse impressed on the discharge paths 15 and 17 causes the positive discharge to be initiated in the one in which the anode-cathode potential is positive. The discharge is extinguished when the same anode-cathode potential passes through zero and becomes negative. By selecting the point in the half cycles of positive anode-cathode potential impressed on the discharge paths 15 and 17 at which the initiating pulse of current is transmitted through the initiating electrodes 25, the magnitude of the current transmitted during any half cycle and, therefore, the magnitude of the current transmitted during a number of half cycles may be predetermined at will.

The ignition systems for the discharge path are similar to the system shown in my Patent No. 2,081,987, for Electric control system, dated June 1, 1937, and assigned to the Westinghouse Electric & Manufacturing Company. In accordance with this patent each of the ignition electrodes 25 of the discharge paths 15 and 17 is supplied with ignition impulses through a pair of auxiliary discharge paths 35 and 37, and 39 and 41. Each of the latter is preferably, though not necessarily, of the hot cathode gaseous type and is provided with an anode 43, a cathode 45 and a control electrode 47. The auxiliary discharge paths 35 and 39 function for selecting the half cycles in which the corresponding main discharge paths 15 and 17 respectively are to be energized and will be hereinafter designated as the timing paths. The other auxiliary discharge paths 37 and 41 function to determine the point in the selected half cycles at which the main discharge paths 15 and 17 respectively are energized and will be hereinafter designated as the heat control paths.

The ignition circuit for the right-hand main discharge path 15 extends from the upper line wire 11 of the supply, through the primary 9 of the welding transformer 7, a conductor 49, the fixed upper contacts 51 of a starting relay 53, which is bridged by a corresponding movable contactor 55 when the relay is energized during operation, a resistor 57, a conductor 59, the anode 43 and the cathode 45 of the associated heat control path 37, a conductor 61, the anode and cathode of the associated timing path 35, a conductor 63, the ignition electrode 25 and the cathode 23 of the main discharge path 15, the conductor 29 to the lower bus 13. The ignition circuit for the left-hand main discharge path 17 extends from the lower supply line wire 13 through the conductor 29, the conductor 31, a conductor 65, a conductor 67, a pair of central fixed contacts 69 of the starting relay 53 which are bridged by a corresponding movable contactor 71 during operation, a resistor 73, a conductor 75, the anode 43 and the cathode 45 of the associated heat control path 41, a conductor 77, the anode and the cathode of the associated timing path 39, a conductor 79, the ignition electrode 25 and the cathode 23 of the main discharge path 17, the conductor 33, the conductor 27, the primary 9 of the welding transformer 7 to the upper line wire 11 of the supply.

As in the above-mentioned patent, timing impulses are supplied to the timing paths by the operation of a non-magnetic disk 81 which is rotated by a synchronous motor 83 from the main source and near the periphery of one face 84 of which magnetic pins 85 are selectively inserted in openings which are uniformly spaced to correspond to the frequency of the supply. As the disk 81 is rotated, the pins move in the air gap 87 between the poles 89 of a permanent magnet 91 of substantially rectangular structure. When a pin 85 moves through the gap 87, impulses are induced in a pair of coils 93 and 95 wound on the magnet 91. The spacing of the openings in the disk 81 is preferably so coordinated with speed of the disc that one opening passes by the gap 87 during each half period of the source taking approximately a quarter period to pass from one end of the gap to the other. Accordingly pins 85 inserted in the disk move in the same manner and each pin as it moves through the gap produces an approximately sinusoidal impulse persisting for approximately a quarter cycle.

In the practice of my invention it is, in general, desirable to transmit current through the welding electrodes 3 intermittently for a number of half cycles with a pause of a number of half cycles between each transmission of current. The desired timing of the current through the welding electrodes 3 is attained by inserting pins 85 in the openings in the face 84 of disk 81 in groups to correspond to the number of half cycles during which current is to be transmitted omitting the pins from openings between groups. The blank openings correspond in number to the number of pause half cycles in each case. For example, if it is desired to transmit current during four half cycles and to interrupt the transmission of current during two half cycles, the pins 85 are arranged in the disk 81 in groups of four with two openings without pins between each group of four. The foregoing arrangement applies particularly to seam welding, or to spot welding in cases where a series of uniformly spaced spots are desired. If only a single spot weld is desired, a single set of pins to correspond to the number of half cycles during which welding current is to flow may be inserted in the disk 81 and the remaining openings may be all left without pins.

Discharge current is transmitted in series through the timing path 35 or 39 and through the heat control path 37 or 41 associated with each ignition electrode 25 to initiate a discharge in the associated main discharge path 15 or 17. During any half cycle during which welding current is to flow the timing paths 35 and 39 are first prepared for operation and then the heat control paths 37 and 41 are energized at the proper points in the corresponding positive half cycles and ignition current flows. Since the timing paths must, therefore, be energized before the heat control paths, the latter are in each case shunted by resistors 97 and 99 of such magnitude that when the timing paths 35 or 39 are supplied with energizing impulses before the heat control paths 37 or 41, they are energized and current flows through the resistors 97 and 99 and through the corresponding ignition electrodes 25. The resistors 97 and 99, however, are so large that the current flowing through the associated ignition electrodes 25 is too small to ignite the corresponding main discharge path 15 or 17. It will be noted that as potential is impressed from the bus conductors 11 and 13 through the resistors 97 and 99 between the anodes 43 and the cathodes 45 of the timing paths 35 and 39, the anode of one timing path is positive relative to the cathode during ultimate half periods of the source while the anode of the other timing path is positive relative to its cathode during the intermediate half periods.

When a pin 85 in the face 84 of the disk 81 passes through the air gap 87 in the magnet 91, the impulse induced in one of the coils 93 is impressed as a potential in a circuit which extends from the upper terminal of the coil through a conductor 101, the lowest pair of fixed front contacts 103 of a timing relay 105 which are during operation bridged by the lowest movable contactor 107, a conductor 109, a resistor 111, a conductor 113, an intermediate pair of fixed contacts 115 of the relay 105 which are during operation bridged by a movable contactor 117, a conductor 119 to the lower terminal of the coil 93. At the same time a potential impulse is impressed through a circuit extending from the upper terminal of the other coil 95 through a conductor 131, the uppermost front contacts 123 of the relay 105 which are bridged during operation by a corresponding movable contactor 125, a conductor 127, a second resistor 129, a conductor 131, a pair of central front contacts 133 of the relay 105 bridged during operation by a movable contactor 135, a conductor 137 to the lower terminal of the coil 95.

The first-mentioned resistor 111 is at one terminal connected to the control electrode 47 of the left-hand timing path 39 through a third resistor 139 and at the other terminal to the cathode 45 of the timing path through a suitable biasing source 141 and the second mentioned resistor 129 is correspondingly connected to the right-hand timing path. The potential impulses induced in the coils 93 and 95 are thus impressed between the control electrodes 47 and the cathodes 45 of the timing paths 35 and 39. The connection of the resistors 111 and 129 to the coils 93 and 95 is such that the polarity of the potential impressed in the control circuits from the coils is the same and early in the half cycles impressed in the timing paths from the source rise to such a value that the total potential in the control circuits of the timing paths is more positive than the critical control potential of the timing paths. Therefore, the timing path 35 or 39 for which the anode-cathode potential is positive will be energized and current will flow through the corresponding series resistor 97 or 99 shunting the corresponding heat control path 37 or 41.

The heat control path is supplied with control potential from a phase shift network 143, the specific structure of which is described in detail in my patent. Briefly, the network comprises a pair of resistors 145 in parallel and a reactor 147 connected in series with the resistors across the secondary winding 149 of a control transformer 151 supplied from the line wires 11 and 13. Across the terminals of the reactor 147 and resistors 145 a voltage divider 153 is connected. The latter is provided with a fixed intermediate tap 155 connected to the junction point of the resistor 145 and the reactor 147 and a movable tap 157 carried on an insulating collar 159 which is mounted to be moved horizontally on a rotatable threaded bar 161. When the bar 161 rotates the collar 159 carries the tap 157 and causes it to slide along the divider 153. The tap 157 is in addition connected through a flexible conductor 163 to the lower common terminal 165 of the primaries 167 and 169 of a pair of auxiliary control transformers 171 and 173. The upper terminals 175 and 177 of the primaries 167 and 169 are connected to each other through a resistor 179 provided with an adjustable tap 181. The latter is connected to the intermediate tap 183 of the secondary 149 of the main control transformer 151. The potential which is thus impressed on the primaries 167 and 169 of the auxiliary control transformers 171 and 173 from the main control transformer 151, between the adjustable tap 181 of the resistor 179 and the variable tap 157 of the voltage divider 153 is an alternating potential of the same frequency as that supplied by the line wires 11 and 13

13 but of a phase relative to the potential of the line wires which is predetermined at will by the setting of the variable tap 157 of the voltage divider.

The secondary 187 of the right-hand auxiliary control transformer 171 is connected between the cathode 45 and the control electrode 47 of the right-hand heat control path 37; the secondary 187 of the other auxiliary control transformer is similarly connected to the right-hand heat control path 41. The connection of the secondaries 185 and 187 is such that potentials of the same polarity are impressed by them in the control circuits of the heat control paths 37 and 41. The control potentials impressed become sufficiently positive, at a point in the half cycles predetermined by the setting of the variable tap 157, to energize the heat control path 37 or 41 on which positive anode-cathode potential is impressed if the corresponding timing path 35 or 39 happens to be energized. When this occurs, the corresponding shunting resistor 97 or 99 will be short circuited and ignition current will flow producing a discharge in the corresponding path 15 or 17 which will persist for the remainder of the half cycle. During the next half cycle the other main discharge path 17 or 15 is energized if the above mentioned conditions for energization exist.

It is seen that as the variable tap 157 of the voltage divider 153 is moved along its windings the actual current transmitted through the main discharge paths 15 and 17 as they are successively energized may be varied from a very small value to a maximum which corresponds to ignition of the main discharge paths very early in their positive half cycles. The energy supplied through the welding electrodes 3 is moreover of considerable magnitude but is intermittent in time. Accordingly, the potential between the supply conductors 11 and 13 is abruptly decreased as it would be by a short circuit at intermittent intervals and such systems as the lighting load 19 on having the fluctuating potential impressed thereon, will vary violently and the lights will flicker.

In accordance with my invention, the flicker and the other conditions arising from variations in the line potential are suppressed by providing a dummy load 189 consisting of a resistor 191 and a reactor 193, the magnitudes of which correspond to the resistance and the reactance of the welding system 3—7. The dummy load is supplied through a pair of main discharge paths 195 and 197 similar to those through which the main load is supplied. The circuit for current flow of one polarity through the dummy load 189 extends from the upper line conductor 11 through a conductor 199, the dummy load 189, a conductor 201, the anode and the cathode of the left-hand main dummy discharge path 195, a conductor 203, the conductor 65, the conductor 31, the conductor 29, to the lower line conductor 13. The circuit for the current of the opposite polarity extends from the lower line conductor 13 through the conductor 29, the conductor 31, the conductor 65, the anode-cathode path of the other main dummy discharge path 197, a conductor 205, the conductor 201, the dummy load 189, the conductor 199 to the upper line conductor 11.

The main dummy discharge paths 195 and 197 are provided with ignition circuits, including timing and heat control paths 207 and 209, and 211 and 213 connected precisely in the same manner as the timing and heat control paths 35 and 37, and 39 and 41 of the main load. The ignition circuits are moreover closed through the lower sets of fixed contacts 215 and 217 of the starting relay 53 which are engaged by movable contactors 219 and 221 during the operation.

Timing impulses are provided by impressing potentials on resistors 223 and 225 in the control circuits of the timing paths 207 and 211 from the coils 227 and 229 of a second magnet 231. The latter magnet is also provided with a gap 233 and its position is such that pins 235, inserted in the opposite face 237 of the disk 81 to that in which the timing pins 85 for the main load are inserted may move through it. The last-mentioned face 237 of the disk 81 is provided with an opening coaxial with the openings in the face 84 and the pins 235 are arranged in the latter openings which correspond to empty openings in the other face 84 of the disk. Potential impulses are impressed on the coils 227 and 229 of the dummy magnet 231 during the times that no such impulses are impressed on the main load coils 93 and 95. Thus the timing paths of the dummy load 189 are supplied with ignition potentials during the times that the discharge paths 15 and 17 of the main load are deenergized.

During operation when the timing relay 105 is energized, potential impulses are supplied by one of the coils 227 of the dummy magnet 231 in a circuit extending from the upper terminal of the coil through a conductor 239, intermediate fixed contacts 241 of the timing relay 105 which, when the relay is energized, are engaged by a movable contactor 243, a conductor 245, the resistor 223 associated with the left-hand dummy timing path 207, a conductor 247 to the lower terminal of the coil. The circuit for the other coil 229 of the dummy magnet extends from the upper terminal through a conductor 249, a pair of intermediate front contacts 251 engaged by a movable contactor 253 when the relay 105 is energized, a conductor 255, a conductor 257, the resistor 225 associated with the right-hand timing path 211, a conductor 259 to the lower terminal of the coil.

The dummy heat control paths 209 and 213 are adjusted to be energized at identically the same relative points in the half cycles in which they are energized as the main load heat control paths 37 and 41 and, therefore, current pulses of the same magnitude as are transmitted through the main load during the active periods are transmitted through the dummy load 189 during the pause periods of the main load. The flicker of lighting loads 19 and potential variations in other loads which happen to be supplied from the main line conductors 11 and 13 are thus eliminated during operation.

During starting and stopping the variations are eliminated by supplying the dummy load 189 continuously with gradually increasing or decreasing current and after the current attains the desired value commencing the intermittent operation. This object is accomplished by the functioning of the timing relay 105 which is adjusted to operate in conjunction with a switch 261 mounted on the rod 161 whereby the position of the variable taps 157 and 263 of the voltage dividers 153 and 265 is adjusted.

Initially the starting and timing relays 53 and 105 respectively are in the position shown in the drawings. The collars 159 and 267 carrying the variable taps 157 and 263 of the voltage dividers 153 and 265 are located along the threaded bar 161 at positions such that if current were transmitted through the ignition circuits of the main and dummy discharge paths 15 and 17 and 195 and 197, the current flow would commence very late in the half cycles and the total current would be substantially zero. As shown in the drawings, the rod 161 may be rotated manually by a crank 269. The rod may also be motor operated and the motor may be started by ordinary push button operation or automatically in response to some variation in potential or current or any other physical condition of the welding load.

At the beginning of the rotation of the rod 161 a pair of fixed contacts 270 of the switch 261 are bridged by a movable contactor 271 carried by a threaded collar 273 which is advanced by the movement of the rod. A circuit is thus closed through the exciting coil 275 of the starting relay and it is energized. Its movable contactors 55, 71, 219 and 221, therefore, engage the corresponding fixed contacts 51, 69, 215 and 217 closing the four ignition circuits for the discharge paths 15, 17, 195 and 197 and thus preparing them for operation. The timing relay 105 remains deenergized and its movable contactors 125, 243, 135, 253, 117 and 107 are, therefore, disengaged from the corresponding fixed contacts 123, 241, 133, 251, 115 and 103 through which energizing potential is alternately supplied to the main and dummy load timing paths 35, 39, 207 and 211.

However, as the pins 85 and 235 on the disk 81 pass through the gaps 87 and 233 of the magnets 91 and 231, impulses are impressed across the resistors 223 and 225 of the dummy timing paths 207 and 211. The circuit for one of the dummy coils 227 extends from its upper terminal through the conductor 239, the uppermost back contacts 277 of the timing relay 105 which is, in the deenergized condition of the timing relay, bridged by the movable contactor 125, the conductor 121, the coil 95 of the main load magnet, the conductor 137, the intermediate back contacts 279 of the relay which are bridged by the movable contactor 135, the conductors 280 and 245, the resistor 223 of the left-hand dummy timing path 207, the conductor 247 to the lower terminal of the coil 227. The circuit for the other coil 229 of the dummy magnet 231 extends from the upper terminal of the coil through the conductor 249, the intermediate back contacts 281 of the timing relay 105 engaged by the movable contactor 253, the conductor 119, the other coil 93 of the main load magnet 91, the lowermost back contacts 283 of the timing relay engaged by the fixed contactor 107, the conductor 257, the resistor 225 associated with the right-hand timing path 211, the conductor 259 to the lower terminal of the coil 229.

It will be noted that in each of the above traced circuits not only are the coils 227 or 229 of the dummy magnet 231 connected, but also the coils 93 or 95 of the main load magnet 91 are connected. On the other hand, as the disk rotates the main load pins 85 and the dummy load pins 235 pass through the gaps 109 and 231 alternately. Therefore, potential impulses are impressed on the resistors 223 and 225 in the control circuits of the dummy timing paths 207 and 211 for all of the half waves of the source and the dummy timing paths receive impulses continuously during each half cycle of the source. The impulses cause the dummy timing paths 207 and 211 to be alternately energized and when the dummy heat control paths 209 and 213 are also energized, the dummy discharge paths 195 and 197 are energized and current is transmitted through the dummy load 189. Initially the variable tap 263 of the voltage divider 265 is so adjusted that the energization of the dummy discharge paths 195 and 197 is late in the half cycles and therefore the current transmitted through the load 189 is very small. As the crank 269 is continuously rotated, however, the collar 267 carrying the variable tap 263 is advanced and the corresponding points in the half cycle at which the dummy discharge paths are energized is correspondingly advanced and the dummy load current is gradually increased. Of course the variable tap 157 moves together with the tap 265 so that the setting for the main discharge paths 15 and 17 corresponds to the setting for the dummy paths 195 and 197.

As the crank 269 is rotated the movable contactor 273 which engaged the fixed contacts 270 associated with the starting relay 53 advances these contacts, and a movable contactor 285 secured thereto through insulating pins 287, against the action of a pair of springs 289. The advance of the latter movable contactor 285 continues until the current transmitted through the dummy load 189 attains the desired value for welding. At this time the movable contactor 285 carried by the fixed contacts 270 engages a corresponding pair of fixed contacts 291 and closes a circuit through the exciting coil 293 of the timing relay 105. The armature 295 of the timing relay is moved upward and its movable contactors 125, 135, 253 and 107 engage the corresponding front fixed contacts 123, 133, 251 and 103. When the pins 85 of the disk 81 now rotate into the gap 87 of the main load magnet 91 energizing impulses are now impressed between the control electrodes 47 and the cathodes of the main load timing paths 35 and 39 in the circuits traced hereinabove and the pins 235 associated with the dummy load magnet 231 have the same effect as regards the dummy timing valves 207 and 211.

The operation now continues as long as the movable contactor 285 of the switch 261 operated by the crank 269 remains in engagement with the fixed contacts 291. When it is desired that the welding operation be discontinued, the crank 269 is rotated in the opposite direction and the converse of the above process takes place. First the timing relay 105 is deenergized, thus discontinuing the operation of the main load discharge paths 15 and 17 and causing the dummy discharge paths 195 and 197 to operate continuously. As the bar 161 continues to rotate, the current flow through the dummy load 189 is gradually decreased until it attains a substantially zero value and after this the movable contactor 271 is disengaged from the fixed contacts 270 in the starting relay circuit and the apparatus is in deenergized condition.

It is to be noted that if the apparatus is to be used for welding a single spot, the above described process may be simulated. In such a case the disk 81 is provided on the face 84 with a group of pins 85 corresponding to the number of half cycles during which the spot welding current is to flow in only one region. On the dummy load face 237, pins are inserted in the openings corresponding to the unfilled openings on the main load face. The crank 269 is now rotated first energizing the starting relay 53 then gradually increasing the supply of current to the dummy load 189 and finally energizing the timing relay 105. The engagement of the contacts 285 and 291 whereby the timing relay is energized may be so arranged as to take place for only the interval occupied by one rotation of the disk 81, as, for example, by providing a properly timed reversing arrangement in the driving mechanism for the crank 269. Consequently, the timing relay 105 will remain in raised position long enough to produce a single weld and will then drop out and make possible the gradual decrease of the supply of energy to the dummy load.

A number of modifications may be made in the apparatus described herein without departing from the scope of my invention. For example, the dummy load 189 may be broken up into a number of individual loads each supplied in the proper timed relationship through suitable discharge paths.

Although I have shown and described certain specific embodiments of my invention, I am fully aware that many modifications thereof are possible. My invention, therefore, is not to be restricted except insofar as is necessitated by the prior art and by the spirit of the appended claims.

I claim as my invention:

1. Apparatus for supplying pulses of power at intermittent intervals from a source to a load comprising an impedance and means for supplying to said impedance pulses of power of substantially the same magnitude as those supplied to said load during the intervals between said load pulses.

2. Apparatus for supplying power from a source to a load comprising means operating to control the supply of power from said source to said load so that said load is supplied at intermittent intervals, supply of power during a number of said intervals being required for one complete operation of said load, an impedance, and means cooperating with said control means to control the supply of power to said impedance so that power of substantially the same magnitude as that supplied to said load is supplied to said impedance during the intervals between said intermittent intervals.

3. Apparatus for supplying power from a source to a first load comprising a second load having substantially the same electrical properties as said first load, a first power supply channel between said source and said first load, means for so controlling said channel that power is supplied to said first load in intermittent pulses, a second power supply channel between said source and said second load and means for so controlling said second channel that power of the same magnitude as said pulses is supplied to said second load in the intervals between the supply of said load pulses.

4. Apparatus for supplying power from a source to a first load comprising a second load, a first power supply channel between said source and said first load, means for so controlling said channel that power is supplied to said first load in intermittent pulses, a second power supply channel between said source and said second load, means for so controlling said second channel that power of the same magnitude as said pulses is supplied to said second load in the intervals between the supply of said pulses and means for gradually increasing the power supplied to said loads from zero to the magnitude of said pulses when the supply of power to said loads is initiated.

5. Apparatus for supplying power from a periodically pulsating source to a first load comprising a second load, a first power supply channel between said source and said first load, means for so controlling said channel that power is supplied to said first load in intermittent pulses, each pulse persisting during one or more pulsations of said source, a second power supply channel between said source and said second load and means for so controlling said second channel that power of the same magnitude as said pulses is supplied to said second load in the intervals between the supply of said load pulses.

6. Apparatus for supplying power from a source to a first load comprising a second load, a first power supply channel between said source and said first load, said channel including electric discharge means having control means, means cooperative with said control means for so controlling said channel that power is supplied to said first load in intermittent pulses, a second power supply channel between said source and said second load, said second channel including electric discharge means having control means, and means cooperative with the last said control means for so controlling said second channel that power of the same magnitude as said pulses is supplied to said second load in the intervals between the supply of said load pulses.

7. Apparatus for supplying power from a source to a first load comprising a second load, a first power supply channel between said source and said first load, means for so controlling said channel that power is supplied to said first load in intermittent pulses, a second power supply channel between said source and said second load and means for so controlling said second channel that power of the same magnitude as said pulses is supplied to said second load in the intervals between the supply of said pulses, said controlling means for said first and second channels being so coupled that when the supply of power to said loads is initiated power is first supplied continuously through said second channel to said second load and gradually increased from zero to the magnitude of said pulses and thereafter is supplied alternately through said first channel to said first load and through said second channel to said second load.

8. Apparatus for supplying power from a source to a first load comprising a second load, a first power supply channel between said source and said first load, means for so controlling said channel that power is supplied to said first load in intermittent pulses, a second power supply channel between said source and said second load and means operating in synchronism with said controlling means for said first channel for so controlling said second channel that power of the same magnitude as said pulses is supplied to said second load in the intervals between the supply of said pulses.

9. Apparatus for supplying power from a source to a load comprising additional load means, a first power supply channel between said source and said load, means for so controlling said channel that power is supplied to said first load in intermittent pulses, additional power supply channel means between said source and said additional load means and means for so controlling said additional channel means that power is supplied to said additional load means in such manner that the total supply of power to said additional load means and to said load is substantially uniform.

10. Apparatus according to claim 6 characterized by the fact that the cooperation between the control means of the discharge means and controlling means for the first and second channels comprises a single member having disposed thereon elements corresponding to the length of the pulses supplied to the loads and the time intervals therebetween, means for moving said member and means cooperative with said elements when said member is in motion for impressing discharge initiating impulses on the control means of the discharge means of both said channels at the proper instants to produce properly timed pulses.

11. Apparatus according to claim 6 characterized by the fact that the cooperation between the control means of the discharge means and controlling means for the first and second channels comprises a single disc having disposed in one face thereof elements corresponding to the length of the pulses supplied to said first load and the time intervals therebetween and having disposed in the other face thereof elements corresponding to the length of the pulses supplied to said second load and the time intervals therebetween, means for rotating said disc and means cooperative with said elements when said disc is in motion for impressing discharge initiating impulses on the control means of the discharge means of both said channels at the proper instants to produce properly timed pulses.

12. Apparatus for supplying power from a periodically pulsating source to a first load comprising a second load, a first power supply channel between said source and said first load, said channel including electric discharge means having control means, means cooperative with said control means for so controlling said channel that power is supplied to said first load in intermittent pulses, each pulse consisting of one or more pulsations of said source, a second power supply channel between said source and said second load, said second channel including electric discharge means having control means, and means cooperative with the last said control means for so controlling said second channel that power of the same magnitude as said pulses is supplied to said second load in the intervals between the supply of said pulses, said controlling means including means for supplying initiating impulses to each of the control means of said discharge means at instants in the periods of said source which may be predetermined at will to properly time the supply of said pulses to said loads.

13. Apparatus for supplying power from a periodically pulsating source to a first load comprising a second load, a first power supply channel between said source and said first load, said channel including electric discharge means having control means, means cooperative with said control means for so controlling said channel that power is supplied to said first load in intermittent pulses, each pulse consisting of one or more pulsations of said source, a second power supply channel between said source and said second load, said second channel including electric discharge means having control means, means cooperative with the last said control means for so controlling said second channel that power of the same magnitude as said pulses is supplied to said second load in the intervals between the supply of said pulses, said controlling means including means for supplying initiating impulses to each of the control means of said discharge means at instants in the periods of said source which may be predetermined at will to properly time the supply of said pulses to said loads, and means for regulating said supplying means so that when the supply of pulses to said loads is being initiated the supply of initiating impulses to said control means commences at an instant late in said periods and its phase point in the successive periods is progressively advanced until the point in the period corresponding to the magnitude of the pulses desired is attained.

14. Apparatus according to claim 13 characterized by the fact that only the second load is supplied with pulses from the initiation of the supply until after the pulses attain the desired magnitude.

15. Apparatus for supplying power from an alternating current source to a load, comprising additional load means, a power supply channel, including a pair of inversely connected electric discharge paths each having means for initiating a discharge therein, interposed between said source and said load, means for impressing initiating impulses on the initiating means during a number of half cycles predeterminable at will thereby to cause current to flow to said load during the said half cycles, additional power supply channel means, including inversely connected discharge path means having means for initiating a discharge therein, interposed between said source and said additional load means and additional means for impressing initiating impulses on the initiating means of said discharge path means for a number of half cycles before and after said first named half cycles which are predeterminable at will, the initiation of the discharge in said discharge path means being such that the supply of power to said load and said load means is substantially uniform during the totality of said half cycles.

16. Apparatus according to claim 15 characterized by means for so adjusting the additional impressing means that when the supply of power to the loads is being initiated, initiating impulses are impressed on the initiating means of the additional control means during a number of successive half cycles predeterminable at will and during the said half cycles the impressing of said initiating impulse varies progressively from a point late in the first of said half cycles to a point in the last of said half cycles that corresponds to the normal current drawn by the load, the additional load means only carrying current during all of said half cycles.

17. Apparatus for supplying power from a source to a load comprising additional load means, a first power supply channel between said source and said load, means for so controlling said channel that power is supplied to said first load in intermittent pulses, additional power supply channel means between said source and a portion of said additional load means and means operating in synchronism with said controlling means, for so controlling said additional channel means that power is supplied to said portion of said additional load means in such manner that the total supply of power to said additional load means and to said load is substantially uniform.

18. Apparatus for supplying power from a source to a load comprising additional load means, a first power supply channel between said source and said load, means for so controlling said channel that power is supplied to said first load in intermittent pulses, additional power supply channel means between said source and at least a portion of said additional load means and means for so controlling said additional channel means that power is supplied to said portion of said additional load means in such manner that the total supply of power to said additional load means and to said load is substantially uniform.

JOHN W. DAWSON.